United States Patent [19]
Lukyanov

[11] Patent Number: 5,297,810
[45] Date of Patent: Mar. 29, 1994

[54] TRANSPORT MEANS FOR INVALIDS

[75] Inventor: Sergei N. Lukyanov, Moscow, U.S.S.R.

[73] Assignee: Mezhdunarodny Fond Miloserdia I Zdorovya, Moscow, U.S.S.R.

[21] Appl. No.: 924,033

[22] PCT Filed: Dec. 3, 1990

[86] PCT No.: PCT/SU90/00257
§ 371 Date: Sep. 30, 1992
§ 102(e) Date: Sep. 30, 1992

[87] PCT Pub. No.: WO92/10156
PCT Pub. Date: Jun. 25, 1992

[30] Foreign Application Priority Data
Aug. 20, 1987 [SU] U.S.S.R. .............................. 4299457

[51] Int. Cl.5 .......................... A61G 5/02; B62M 1/12; B62M 1/14
[52] U.S. Cl. ................................. 280/250.1; 280/233; 280/234; 280/240; 280/242.1
[58] Field of Search .................... 280/250.1, 240, 246, 280/244, 282, 247, 248, 5.28, 5.3, 242.1, 233, 234

[56] References Cited

U.S. PATENT DOCUMENTS

| 645,144 | 3/1900 | Tolson | 280/240 |
| 689,303 | 12/1901 | Hall | 280/240 |
| 4,560,181 | 12/1985 | Herron . | |
| 4,762,332 | 8/1988 | Seol . | |
| 4,798,395 | 1/1989 | Shaffer et al. . | |
| 4,865,344 | 9/1989 | Romero, Sr. et al. . | |

FOREIGN PATENT DOCUMENTS

| 3809044 | 9/1989 | Fed. Rep. of Germany . |
| 1138156 | 2/1985 | U.S.S.R. . |
| 1210824 | 2/1986 | U.S.S.R. . |

Primary Examiner—Mitchell J. Hill
Attorney, Agent, or Firm—Ladas & Parry

[57] ABSTRACT

A wheelchair having two driving wheels (4, 19) with two corresponding hand levers (7, 20), and two transmission mechanisms (16) which convert the swinging motion of their levers (7, 20) into rotary movement of the driving wheels (4, 19). Each transmission mechanism (16) has a guide (34) accommodating, a rod (36) with a rack (38), a gear (40) interacting with the rack (38) and with the overrunning clutch (7) of its driving wheel (4), and a coupling (42). The driven wheel (3) is self-aligned.

7 Claims, 6 Drawing Sheets

TRANSPORT MEANS FOR INVALIDS

FIELD OF THE INVENTION

The invention relates to transport facilities and, more particularly, to wheelchairs for invalids.

PRIOR ART

Known in the prior art is a transport vehicle comprised of a frame with a seat, installed on driven wheels and on one driving wheel having a yoke secured in the frame bearing, a hand lever installed on the frame with provision for swinging and provided with a turning handle connected by shafts and bevel gears with the driving wheel yoke. The vehicle has also a transmission mechanism which converts the swinging motion of the lever into the rotary movement of the driving wheel, and an overrunning clutch mounted on the driving wheel axle.

The transmission mechanism has the form of a block installed on the driving wheel axle and connected by the overrunning clutch with the driving wheel at one side and by a flexible tie with the frame post at the other (SU, A, 1138156).

The known transport vehicle only has low maneuverability since it cannot move sideways. The limited nature of its motion is due to the fact that the driven wheels are rigidly secured to the frame and, consequently, cannot turn around their vertical axis. When the driving wheel turns sidewise, the vehicle only turns around one of its driven wheels but fails to move sidewise. Besides, the provision of only one driving wheel is unable to impart side motion to the vehicle due to an insufficient adhesion of the wheel and the ground.

SUMMARY OF THE INVENTION

The main object of the invention lies in providing a wheelchair for invalids which would includes such additional elements which add to its maneuverability.

This object is attained by providing transport means for invalids comprising a frame with a seat installed on driven and driving wheels with the driving wheel yoke secured in the frame bearing, a band lever installed on the frame with provision for swinging and having a turning handle connected to the driving wheel yoke via shafts and bevel gears, a transmission mechanism which converts the swinging motion of the lever into the rotary motion of the driving wheel, and an overrunning clutch mounted on the driving wheel axle wherein, according to the invention, there is a second driving wheel and a second hand lever with a turning handle connected by shafts and bevel gears with the yoke of the second driving wheel, the transmission mechanism of each driving wheel comprising a guide formed in the yoke of its driving wheel and accommodating a rod with a rack, passing through the frame bearing, a gear mounted on the driving wheel axle and interacting with the rack and with the overrunning clutch of its driving wheel, and a coupling connecting one of the shafts with the rod while the driven wheel is self-aligning.

This arrangement ensures a high maneuverability of the wheelchair because when both driving wheels are turned to the side, the wheelchair moves sideways and the self-aligning driven wheel does not create a point of turning. If the driving wheels are set out of parallel, the point of rotation of the wheelchair is determined by the intersection of the driving wheel axles.

It is reasonable that the rod of each transmission mechanism should be provided with an additional rack located on the side of the driving wheel axle opposite the first rack and interacting with its driving wheel via the additional gear and overrunning clutch.

Such a layout rules out the free travel of the hand levers because the racks transmit rotation to the driving wheel in turns. On the upward stroke of the rod, the rotary motion is transmitted by one rack while the other rack moves idly due to the free travel of the overrunning clutch. On the downward stroke of the rod the rotary movement is transmitted by the other rack while the first one moves idly due to the free travel of the other overrunning clutch.

To promote reliability of design, the coupling in each transmission mechanism, connecting the rod with the shaft has the form of a cardan joint and that each hand lever should be secured to the frame by a hinged joint.

This arrangement permits transmitting force from the hand lever to the rod and transmitting torque from the shaft to the rods in any position of the hand lever.

In another embodiment of the wheelchair the coupling connecting the rod with the shaft in each transmission mechanism is in the form of a Hooke's joint and each lever is connected by a hinge to the link which is secured to the frame by another hinge joint.

This arrangement also permits the force to be transmitted from the hand lever to the rod and the torque to be transmitted from the shaft to the rod in any position of the hand lever. In addition, this version is simpler in design than the preceding one.

The driven wheel is self-aligned by providing its yoke with a vertical turning axle which does not intersect the rotation axle of the driven wheel.

This arrangement represents a simple design of the wheelchair.

The yoke of each driving wheel is provided with a beveled stop while the frame is provided at each driving wheel with a hinged catch bearing against the stop when the driving wheel is in the front position.

This arrangement facilitates setting the driving wheels in a strictly forward position for straight ahead movement of the wheelchair.

The frame can be provided with two articulated foot levers connected by joints with the links which, in turn, are connected by joints with the hand levers.

The provision of foot levers facilitates the swinging motion of the hand levers and permits use of the feet for restoring their functions.

BRIEF DESCRIPTION OF THE DRAWINGS

For a better understanding of the invention it will described in detail with reference to the appended drawings wherein.

DETAILED DESCRIPTION OF A BEST MODE OF CARRYING OUT THE INVENTION

Figure 1:
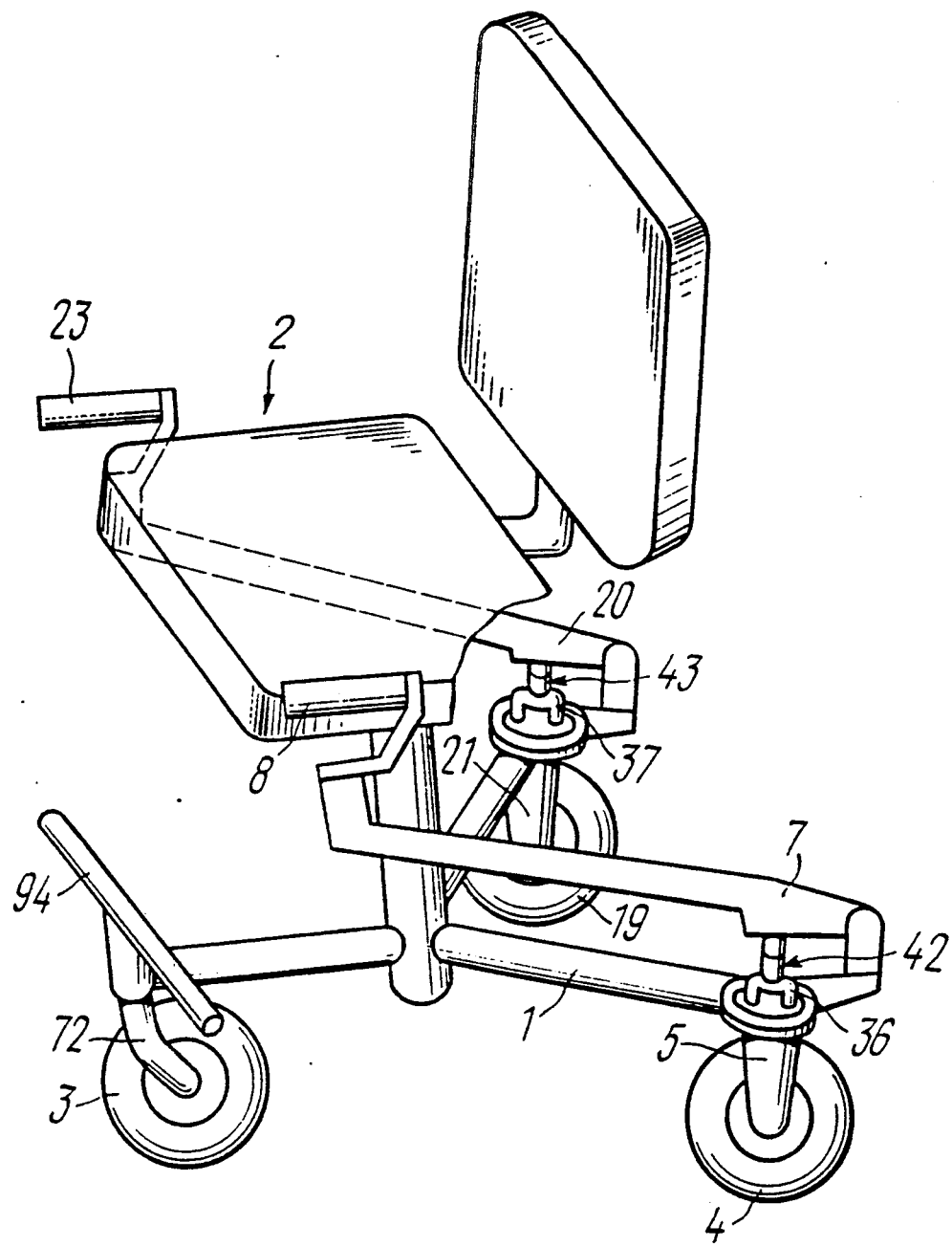
FIG. 1 is a perspective view, partly broken away, of the wheelchair for invalids, according to the invention.

The disclosed wheelchair for invalids comprises a frame 1 (FIG. 1) with a seat 2 secured thereto and mounted on one driven wheel 3 and one driving wheel 4 provided with a yoke 5 fastened in a bearing 6 (FIG. 2) of the frame 1. The wheelchair also has a hand lever 7 capable of swinging on the frame 1 and provided with a handle 8 for turning the driving wheel 4 connected with the yoke 5 of the driving wheel 4 by shafts 9, 10, 11 and bevel gears 12, 13, 14, 15, a transmission mechanism 16 which converts the swinging motion of the lever 7 into the rotary motion of the driving wheel 4, and an overrunning clutch 17 (FIG. 3) mounted on the axis 18 of the driving wheel 4.

According to the invention, the wheelchair for invalids comprises a second driving wheel 19 (FIG. 1) and a hand lever 20 whose construction is similar, respectively, to the driving wheel 4 and hand lever 7.

The driving wheel 19 is fastened to the frame 1 via its yoke 21 secured in the bearing 22 (FIG. 2) of the frame 1 while the lever 20 is mounted on the frame 1 with a provision for swinging motion.

The hand lever 20 carries a handle 23 for turning the driving wheel 19, said handle 23 being connected with the yoke 21 of the driving wheel 19 by shafts and bevel gears in the same manner as handle 8 is connected to yoke 5.

The wheelchair for invalids according to the invention also comprises a second transmission mechanism 31 which converts the swinging motion of the lever 20 into the rotary motion of the driving wheel 19, and a second overrunning clutch 32 (FIG. 3) of the driving wheel 19.

Each transmission mechanism for each drive wheel 4, 19 is substantially identical and description will hereafter be given for transmission 16 for drive wheel 4. The transmission 16 which converts the swinging motion of lever 7 into the rotary motion of driving wheel 4, 35 has a guide 34 located in the yoke 5 of the corresponding wheel 4. The guide 34 accommodates a rod 36 passing through the bearing 6 of the frame 1 and carrying a rack 38. The transmission mechanism 16 has a gear 40, 41 installed on the axle 18 of its driving wheel 4 and interacting with the rack 38 and the overrunning clutch 17 of its driving wheel 4, and a coupling 42 (FIG. 2) connecting the shaft 11 with the rod 36.

The shafts 9, 10, 11 of the left hand lever 7 (FIG. 2) are installed in the bearings 44, 45, 46, 47.

The left hand driving wheel 4 (FIG. 3) is mounted on bearings 48 while its gear 40, is mounted on bearings 49.

Figure 4:
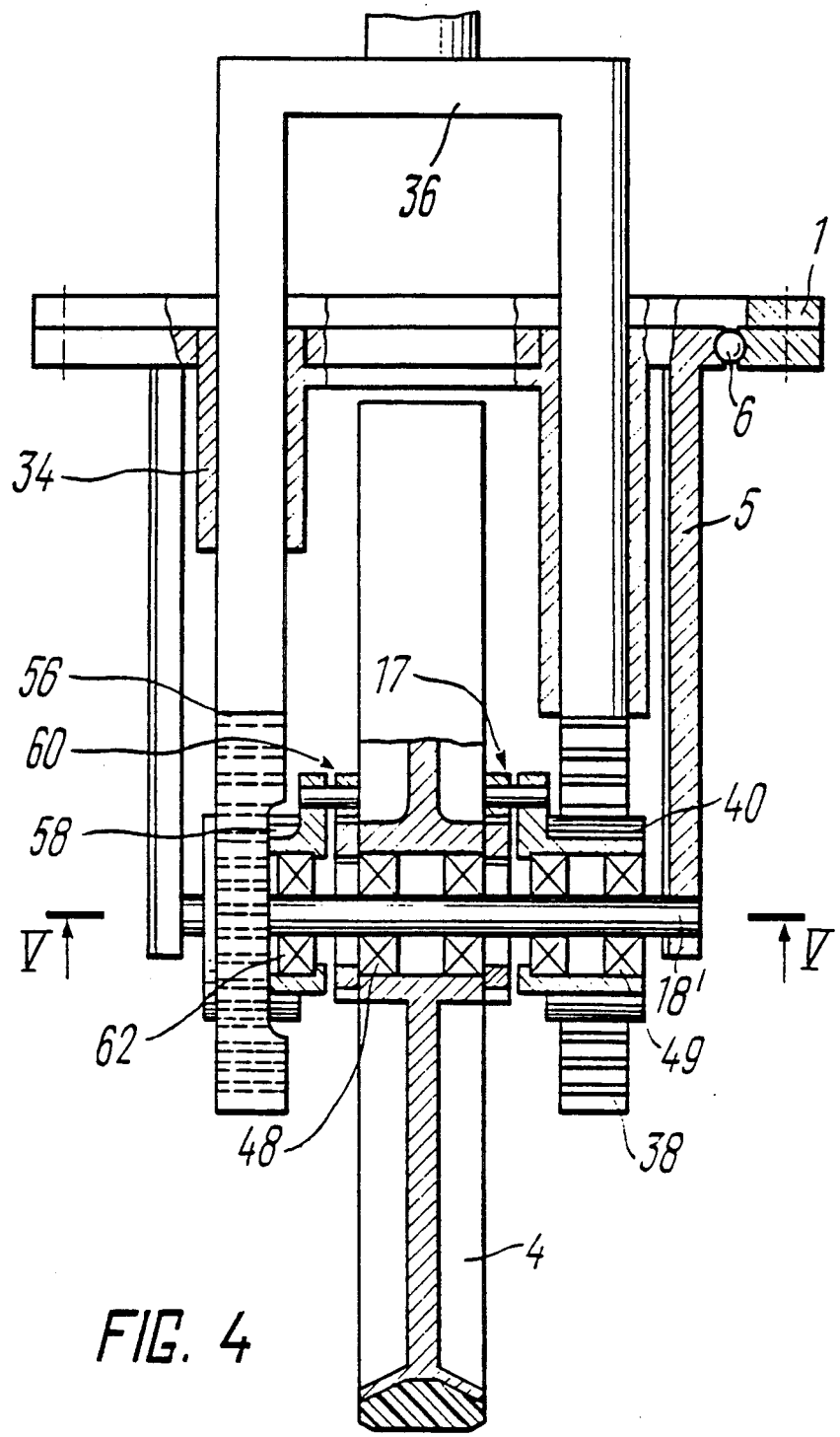
FIG. 4 is similar to FIG. 3 showing the transmission mechanism with an additional rack, gear and overrunning clutch according to the invention.
Figure 5:
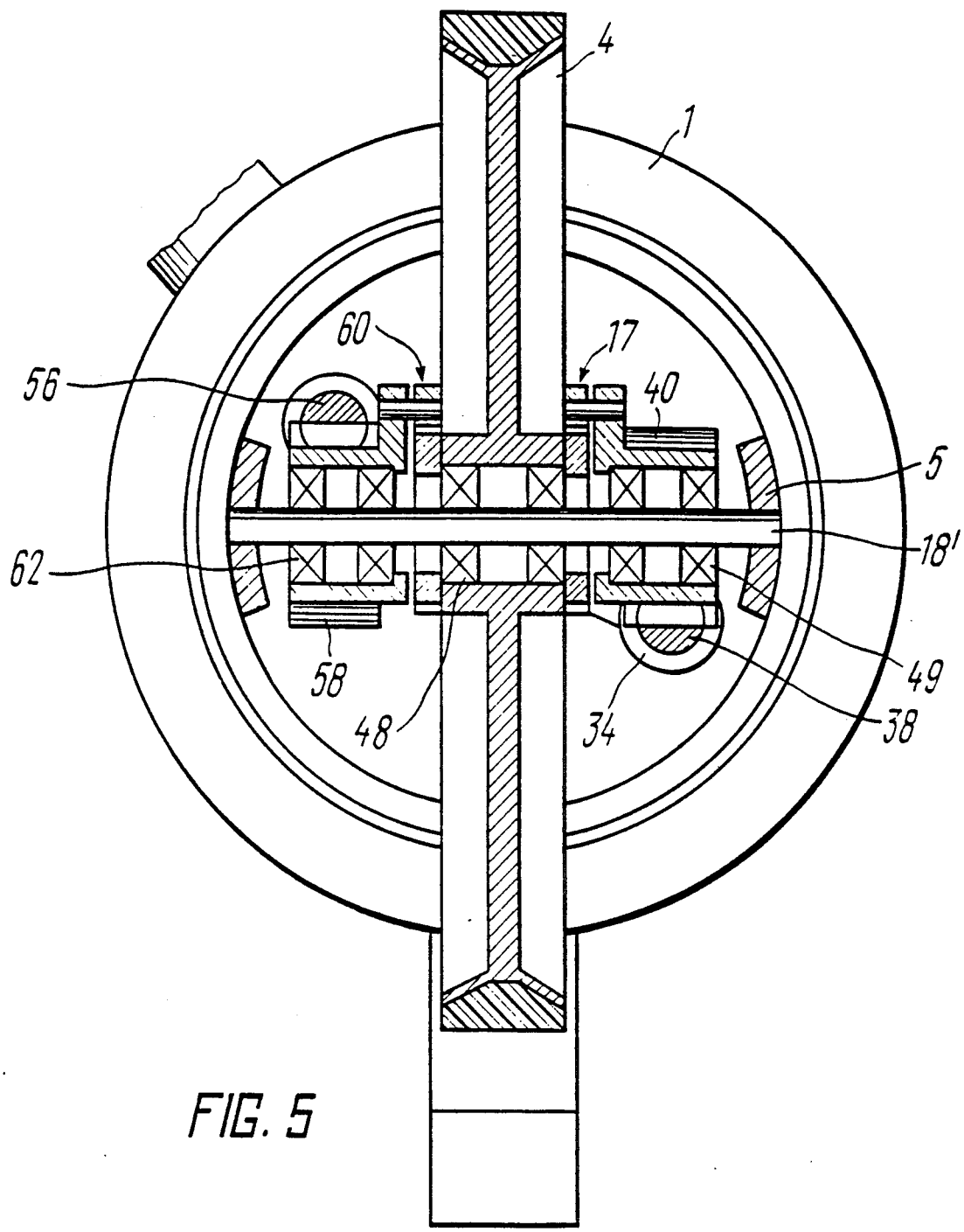
FIG. 5 is a sectional view taken along line V—V in FIG. 4.

The wheelchair for invalids may be made without idle strokes of the hand levers 7, 20. For this purpose the rod 36 of each transmission mechanism 16 has an additional rack 56 (FIGS. 4, 5) arranged on the side of the axle 18 of the driving wheel 4 opposite the first rack 38, and interacting via additional gear 58 and overrunning clutch 60 with its driving wheel 4. The clutches 17, 60 of the driving wheel 4 run free in the same direction as do the clutches 32 of the driving wheel 19. The gear 58, is mounted in bearing 62.

In another embodiment of the wheelchair for invalids each transmission mechanism 16 may have a coupling 42 connecting the rod 36 with the shaft 11 in the form of a cardan joint or universal joint (FIG. 2) and each hand lever 7 is secured to the frame 1 by means of joint 64.

Figure 6:
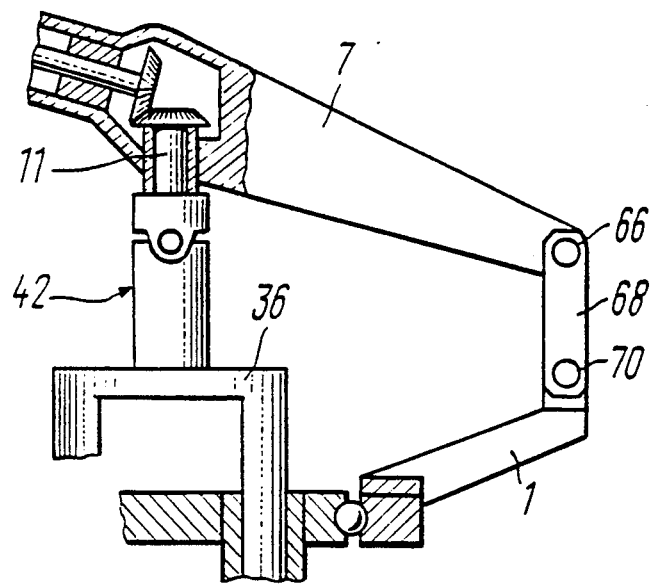
FIG. 6 shows partly in section an embodiment of the lever-to-frame fastening assembly through a link, and the connecting coupling in the form of a Hooke's joint.

In a simplified version of the wheelchair each transmission mechanism 16 may have a coupling 42 connecting the rod 36 with the shaft 11 in the form of a Hooke's joint (FIG. 6) and each hand lever 7 is fastened via the joint 66 to the link 68 which, in turn, is fastened to the frame 1 by another joint 70.

Self-alignment of the driven wheel 3 is achieved by providing the yoke 72 (FIG. 2) of the drive wheel 3 with a vertical turning axle 73 installed in bearings 74 and not intersecting the rotation axle 75 of the driven wheel 3. The wheelchair may have two or more self-aligning driven wheels.

Figure 2:
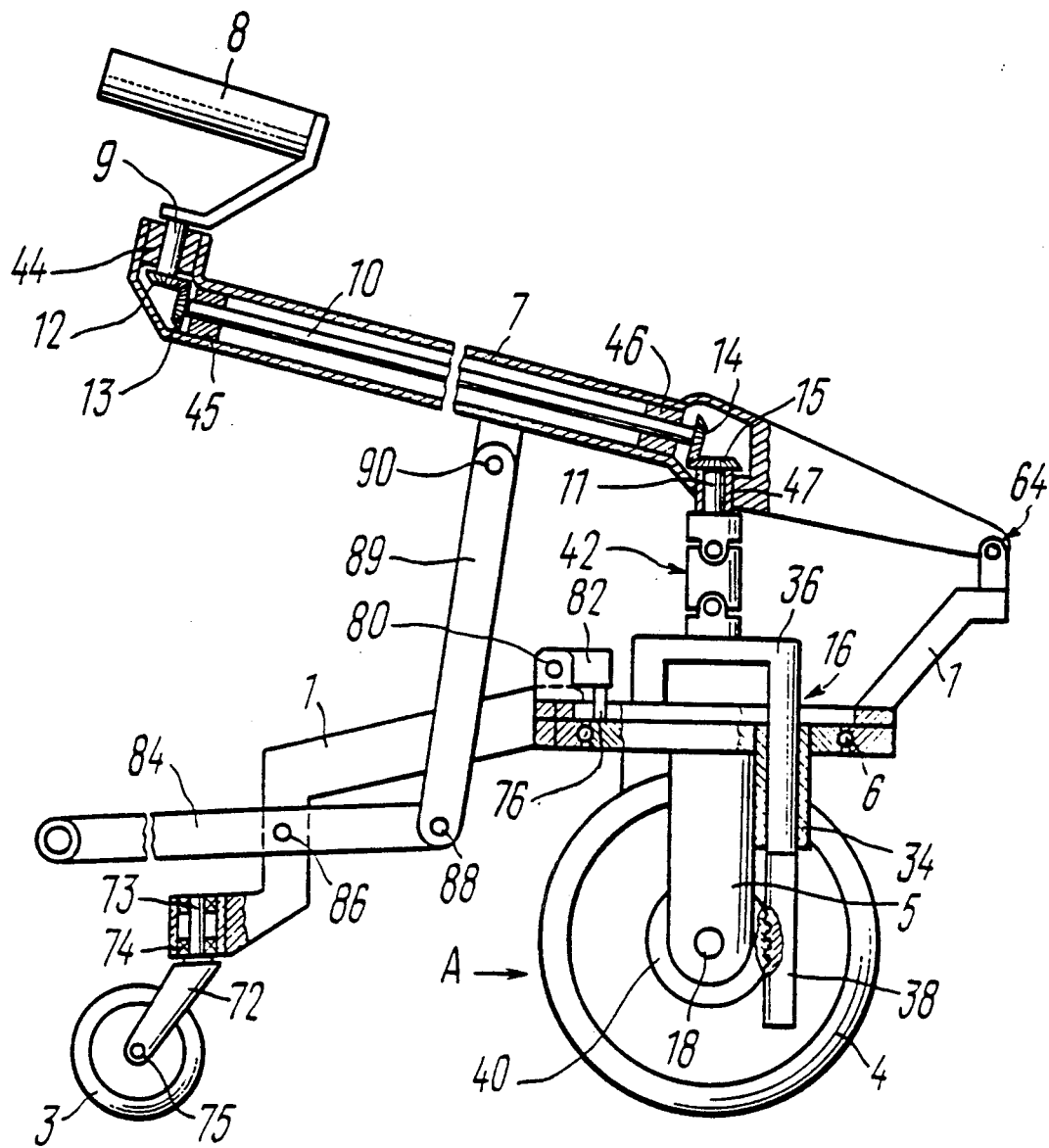
FIG. 2 is a side view of the wheelchair for partially in section.
Figure 3:
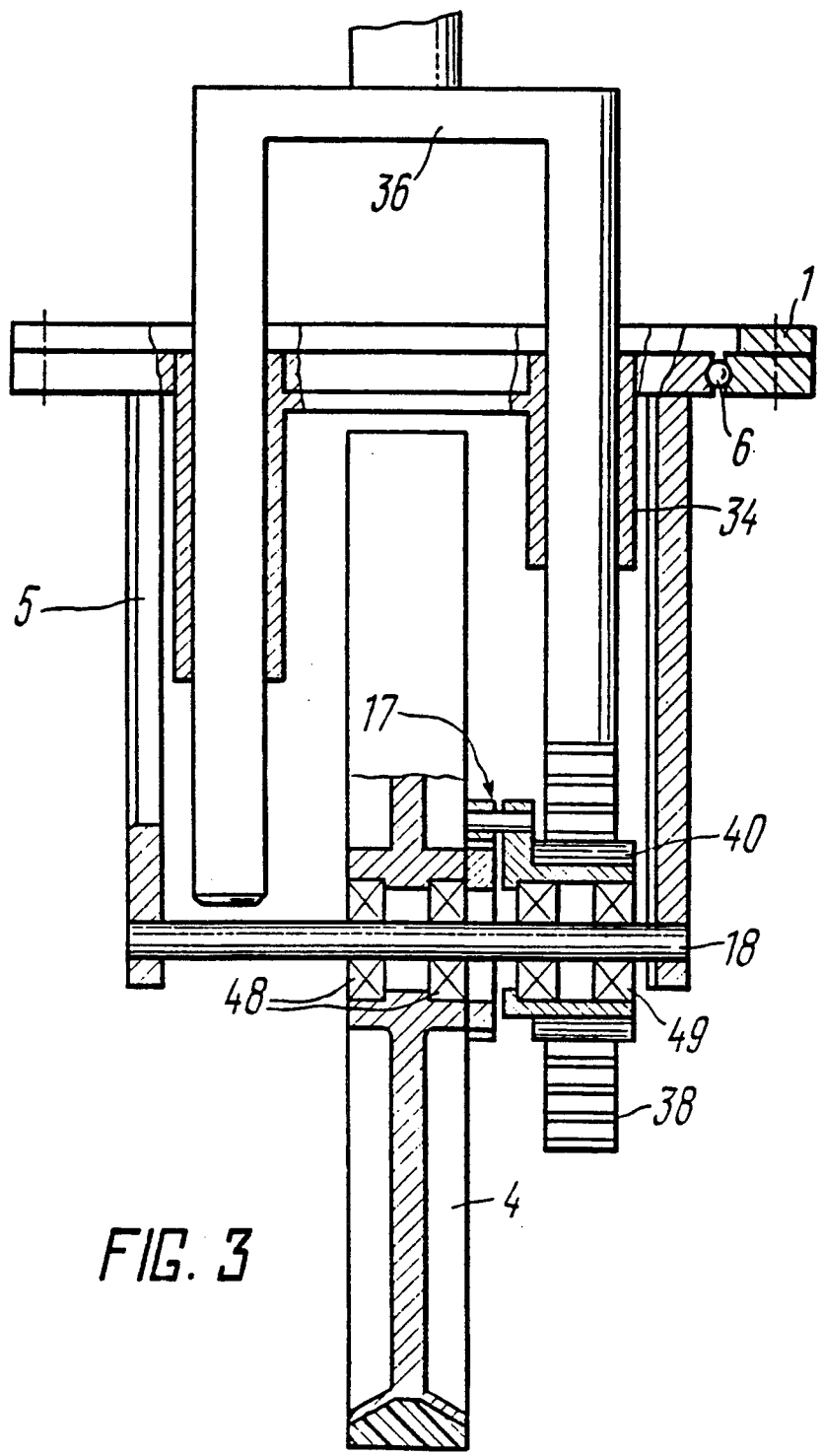
FIG. 3 is a view in the direction of arrow A in FIG. 2.
Figure 7:
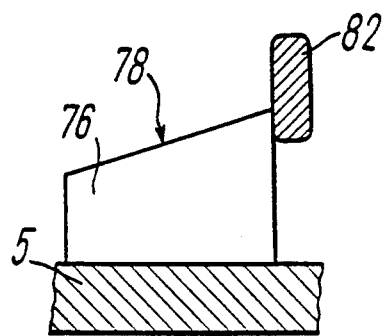
FIG. 7 is a longitudinal sectional view which shows the position of the catch and stop for the right hand driving wheel in its front position and, FIG. 8 is a longitudinal section which shows the position of the catch and stop for the left hand driving wheel in its front position.
Figure 8:
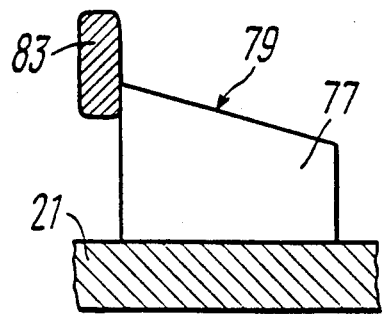

To facilitate bringing the driving wheels to a strictly front position, the yoke 5, 21 of each driving wheel 4, 19 has a stop 76 (FIG. 7), 77 (FIG. 8) provided with a bevel 78, 79 while the frame 1 carries a catch 82, 83 at each driving wheel 4, 19. This catch bears against the stop 76, 77 when the driving wheel 4, 19 is in the front position, and is hinged on an axle 80 (FIG. 2). The direction of bevels 78, 79 on the stops 76, 77 of the right hand and left hand driving wheels 4, 19 is shown in FIGS. 7 and 8.

Secured additionally by joints 86 to the frame 1 may be two foot levers 84 (FIG. 2). The left foot lever 84 is connected by a joint 88 with a link 89 which, in turn, is connected by a joint 90 with the left hand lever 7. The right foot lever 84 is connected by joint 88 with link 89 which, in turn, is connected by joint 90 with the right hand lever. If the foot drive is not required, the frame 1 is provided with a footrest 94 (FIG. 1).

The wheelchair for invalids functions as follows.

The patient operates the levers 7, 20 by swinging down their handles 8, 23. The left hand lever 7 transmits the force via the shafts 9, 10, 11, coupling 42, rod 36, rack 38, gear 40, and overrunning clutch 17 to the left driving wheel 4. The right hand lever 20 transmits force similarly to the right driving wheel 19.

On their upward stroke the levers 7, 20 execute the idle motion and do not transmit any force due to the free travel of the clutches 17.

If the left wheel 4 is provided with an additional rack 56, gear 58 and overrunning clutch 60, these parts on the upward stroke of the lever 7 transmit the force to the left driving wheel 4. If, however, the right wheel is provided with additional rack 59, gear 59 and overrunning clutch, they transmit the force to the right driving wheel 19 on the upward stroke of the lever 20.

If the frame 1 is provided with left hand and right hand foot levers, the patient operates them with his feet and assists the upward swinging motions of the hand levers 7, 20 via the links 84 and 89.

The travelling direction of the wheelchair is selected by turning the handles 8, 23. The left hand handle 8 turns the left driving wheel and the right hand handle 23 turns the right driving wheel 19 respectively 4 via shafts 9, 10, 11, bevel gears 12, 13, 14, 15, coupling 42, rod 36, guide 34 and respective yokes 5 and 21. via the shafts 24, 25, 26, bevel gears 27, 28, 29, 30. For straight-ahead movement, the driving wheels 4, 19 are brought to a strictly front position. For this purpose the left hand handle 8 is rotated clockwise until the stop 76 comes to bear against the catch 82 while the right hand handle 23 is rotated counterclockwise until the stop 77 comes to bear against the catch 83. Reverse rotation of the handles 8, 23 is unhampered due to sliding of the catches 82, 83 over the bevels 78, 79.

For sidewise motion, the handles 8, 23 and, correspondingly, wheels 4, 19 are turned sideways. The wheelchair is braked by sharp turning of the handles 8, 23.

The wheelchair can start moving from rest in any direction without preliminary turning by merely rotating the handles 8, 23 in parallel in the desired direction. Additionally, it can rotate around any point on a surface. The point of rotation is determined by the intersection of the axles 18, of the driving wheels 4, 19.

The kinematic layout of the wheelchair for invalids chourod its long-lasting service.

INDUSTRIAL APPLICABILITY

The present invention will be most useful in the capacity of a highly maneuverable manually operated transport facility for invalids.

Furthermore, the invention may be used both by disabled and able body persons as a training aid.

I claim:

1. An invalid vehicle comprising:
   a frame with a seat;
   a driven wheel by which said frame is supported;
   a driving wheel by which said frame is also supported;
   a bearing of said frame;
   a fork of said driving wheel secured in said bearing;
   a second driving wheel;
   a hand lever mounted on said frame for swinging movement;
   said hand lever including a handle to produce turning of said first driving wheel, said handle being connected to said fork of said first driving wheel;
   bevel gears connecting said handle to said fork of said first driving wheel;
   shafts on which said bevel gears are mounted;
   a second hand lever mounted to said frame;
   said second hand lever including a handle connected to the fork of said second driving wheel;
   further bevel gears connecting the fork of said second driving wheel to said handle of said second hand lever;
   further shafts on which said further bevel gears are mounted;
   a guide in each of said forks for the respective driving wheel;
   a rod disposed in said guide and extending through said bearing of said frame;
   a rack on said rod;
   a pinion mounted on each axle of the driving wheels and engaged with a respective said rack;
   an overrunning clutch on each driving wheel engaged with said pinion, said guide, said rod and rack, said pinion and said overrunning clutch forming a transmission mechanism for converting the swinging motion of said associated hand lever into rotary motion of the associated said driving wheel; and
   a further clutch connecting one of said shafts to said rod;
   said driven wheel being self-orientable.

2. The invalid vehicle according to claim 1, wherein comprising a second rack connected to said second rod and arranged relative to said first rack on the other side of the axle of the first said driving wheel and interacting through an additional pinion and an overrunning clutch with the respective said driving wheel.

3. The invalid vehicle according to claim 1, wherein each of said clutches connecting the respective shaft and rod comprises a universal joint, each of said hand levers being hingeably attached to said frame.

4. The invalid vehicle according to claim 1, wherein each of said clutches connecting the respective shaft and rod comprises a Hooke's joint, each of said hand levers being hingeably attached to said frame.

5. The invalid vehicle according to claim 1, wherein said driven wheel includes a fork having a vertical fulcrum which does not intersect an axis of rotation of said driven wheel.

6. The invalid vehicle according to claim 1, comprising a stop with a bevel surface, said stop being attached to each of said forks of each of said driving wheels, and a screw interacting with said stop in a front position of the driving wheel and attached by an axle to said frame.

7. The invalid vehicle according to claim 1, comprising two foot levers hingeably connected to said hand levers.

* * * * *